United States Patent [19]
McCurry et al.

[11] Patent Number: 5,320,463
[45] Date of Patent: Jun. 14, 1994

[54] DEPTH STOP FOR A PLUNGE ROUTER

[75] Inventors: Ronald C. McCurry, West Union; Robert McCracken; Dale E. Childs, both of Easley, all of S.C.

[73] Assignee: Ryobi Motor Products Corp., Easley, S.C.

[21] Appl. No.: 66,483

[22] Filed: May 24, 1993

[51] Int. Cl.⁵ .................. B23C 1/20; B27C 5/10
[52] U.S. Cl. ................... 409/182; 144/134 D; 144/136 C
[58] Field of Search ............... 409/175, 178, 181, 182, 409/184; 144/134 D, 136 C; 408/241 S, 14

[56] References Cited

U.S. PATENT DOCUMENTS

| | | | |
|---|---|---|---|
| 3,897,166 | 7/1975 | Adams | 408/14 |
| 4,566,830 | 1/1986 | Maier et al. | 409/182 |
| 4,652,191 | 3/1987 | Bernier | 409/182 |
| 4,674,548 | 6/1987 | Mills et al. | 144/134 D |
| 4,770,573 | 9/1988 | Monobe | 409/182 |
| 4,813,822 | 3/1989 | Biek | 408/14 |
| 4,878,644 | 11/1989 | Downing | 248/674 |
| 5,078,557 | 1/1992 | McCracken | 409/182 |
| 5,088,865 | 2/1992 | Beth et al. | 409/182 |
| 5,143,494 | 9/1992 | McCurry | 409/182 |
| 5,191,921 | 3/1993 | McCurry | 144/134 D |
| 5,207,253 | 5/1993 | Hoshino et al. | 144/136 C |

FOREIGN PATENT DOCUMENTS 506073  9/1954  Canada .................. 144/136 C

*Primary Examiner*—William Briggs
*Attorney, Agent, or Firm*—Brooks & Kushman

[57] ABSTRACT

A plunge type router having a thumb screw depth stop mounted to the base of the router. The depth stop is comprised of a stop member encircled by a scale sleeve, wherein the two cooperate translationally to provide both visual and audible indications of the precise depth-of-cut for the router.

12 Claims, 2 Drawing Sheets

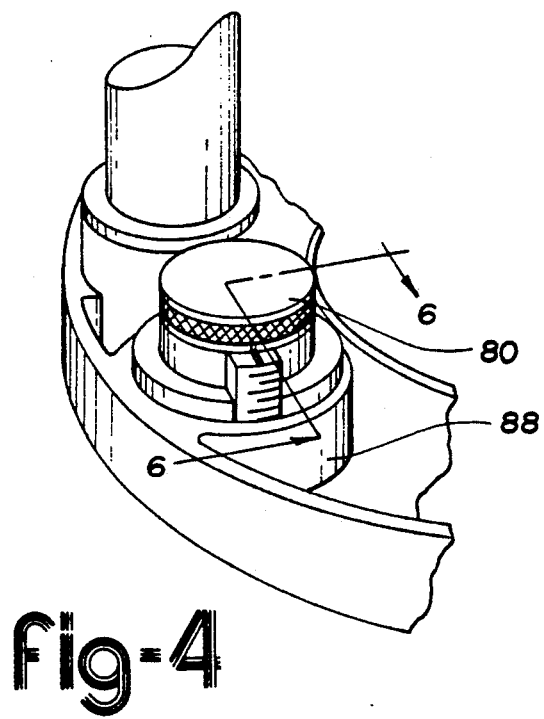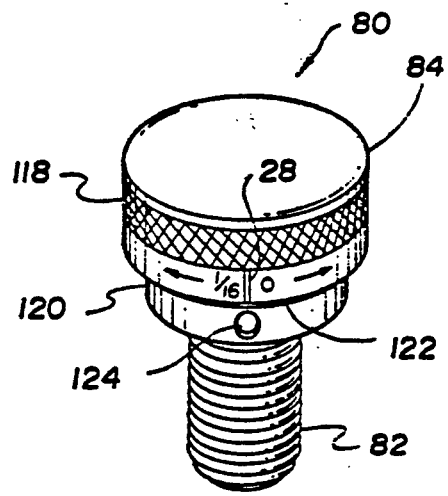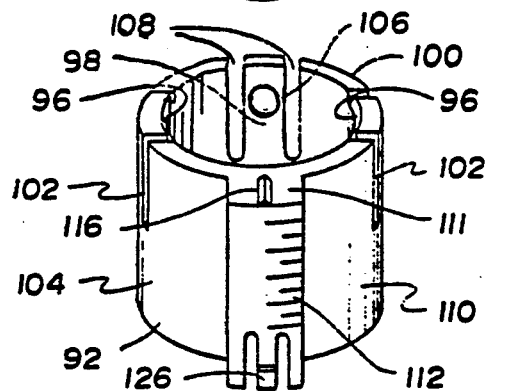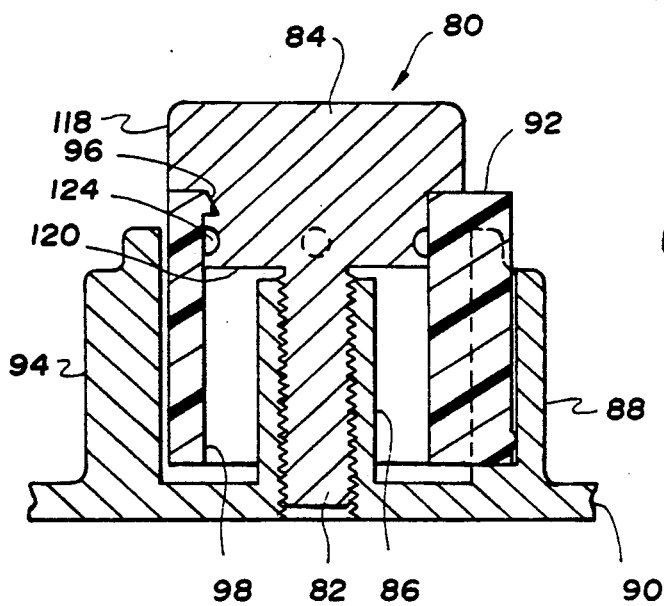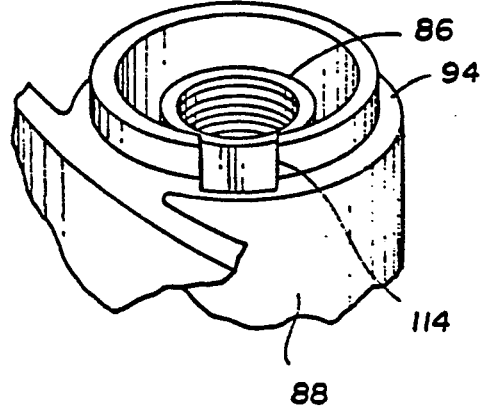

DEPTH STOP FOR A PLUNGE ROUTER

TECHNICAL FIELD

The present invention relates to plunge routers and, more particularly, to depth-of-cut mechanisms on plunge routers.

BACKGROUND ART

A plunge router is typically designed with a separate motor housing and base that are assembled together to form the overall unit. The base typically rests on a router table or the workpiece surface, and has vertical supports or shafts upon which the motor housing may be mounted. The motor housing is mounted on these supports in a way that allows it to slide up or down relative to the base. This configuration allows the motor to be activated prior to lowering the motor housing toward the base and causing the rotating cutting blade of the router to engage the workpiece. When the proper depth-of-cut is attained, the motor housing can then be locked in this position relative to the base until the cut is finished.

Plunge routers, therefore, need some type of mechanism that prevents further travel of the motor housing relative to the base once the cutting blade reaches the desired depth-of-cut. These mechanisms, often referred to as depth stops, are known in the art and are either inexpensive, such as a simple thumb screw depth stop, or are very complex, such as the more expensive multi-position turret depth stop. One difficulty, in particular, when using a simple thumb screw depth stop is obtaining the desired accuracy needed for the particular depth-of-cut. Some prior art designs use printed scales to measure cutting blade positions, however, when dealing with very fine increments, the operator may have difficulty visually discerning one location on the scale from the next.

SUMMARY OF THE INVENTION

It is, therefore, an object of the present invention to provide a plunge-type router having an improved depth stop mechanism incorporating the cost advantage and simplicity of a thumb screw depth stop with the accuracy and convenience of the more expensive multi-position turret depth stop.

It is a further object of the present invention to provide an improved depth stop which provides increased accuracy by allowing the router operator to use visual and/or audible cues when setting the depth-of-cut.

In carrying out the above objects, and other objects, features and advantages of the present invention, there is provided an apparatus for controlling the depth-of-cut in a plunge-type router. The apparatus has a motor housing which slides along support shafts mounted on a base to obtain a preset depth-of-cut. The apparatus comprises a boss fixed to the base, and a stop assembly including a knob and a threaded screw member protruding therefrom for setting the desired depth-of-cut. The threaded screw member has threads spaced at a predetermined thread pitch threadably engaging the boss. The motor housing abuts the stop assembly upon reaching the desired depth-of-cut. The depth of stop mechanism also comprises a scale sleeve disposed within the boss, the scale sleeve being biased against the knob for axial movement therewith. The scale sleeve cooperates with the boss to prevent relative rotation. The mechanism also comprises a scale for identifying the depth-of-cut of the plunge router.

The advantages accruing to the present invention are numerous. For example, the present invention provides a depth stop mechanism that is easy to operate and manufacture, while providing both visual and audio indications of the depth-of-cut.

The above objects, and other objects, features and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 4 is a perspective view of a second embodiment of the plunge router depth stop mechanism of the present invention;

FIG. 5 is an exploded view of the depth stop mechanism of FIG. 4; and

FIG. 6 is a cross-section of the depth stop mechanism of FIG. 4, taken along line 6—6.

BEST MODE FOR CARRYING OUT THE INVENTION

Figure 1:
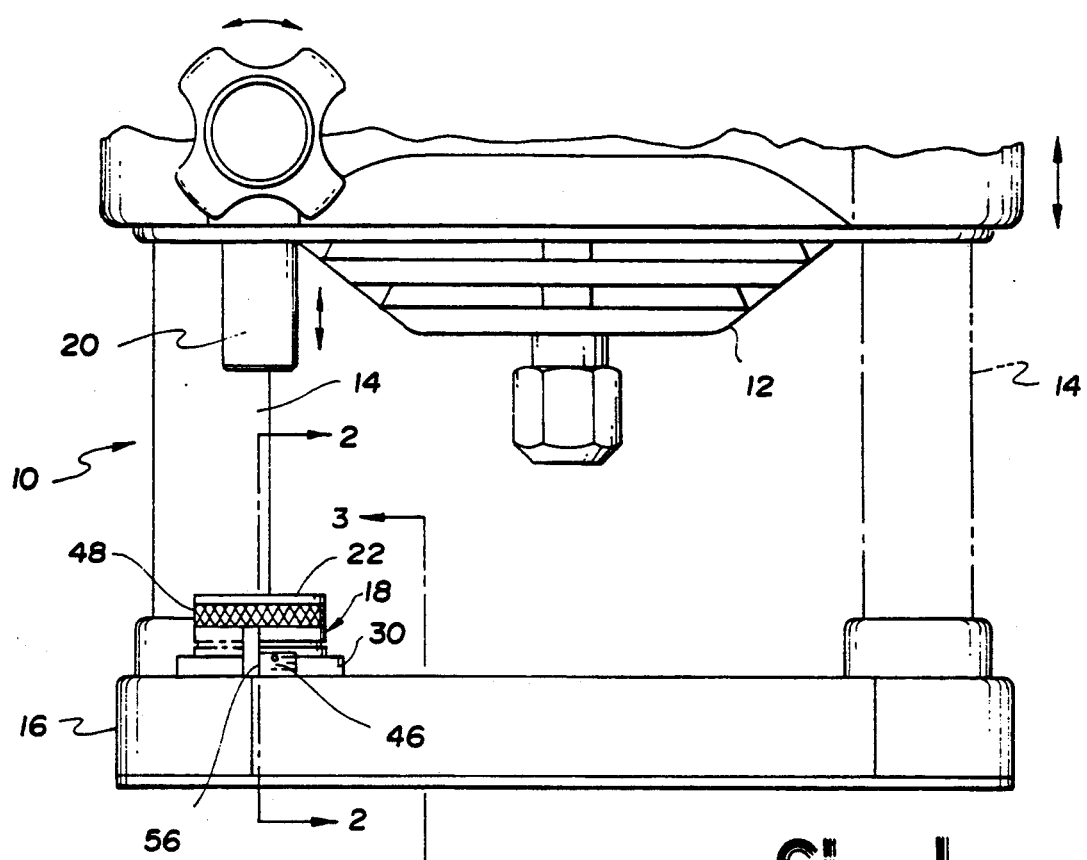
FIG. 1 is a side view of the lower portion of a plunge-type router incorporating the depth stop of the present invention.

Referring now to FIG. 1, there is illustrated the lower portion of a plunge router 10, which includes a motor housing 12 mounted on two column shafts 14 extending from a base 16. The motor housing 12 is mounted on the columns 14 so as to permit the housing 12 to be raised and lowered with respect to the base 16 as shown by the arrows. The travel of the motor housing 12 toward the base 16 is limited by a depth stop assembly 18, in that, the motor housing 12 will be prevented from travelling further when the adjustable stop ram 20 of the motor housing 12 abuts the top surface 22 of the depth stop assembly 18.

Figure 2:
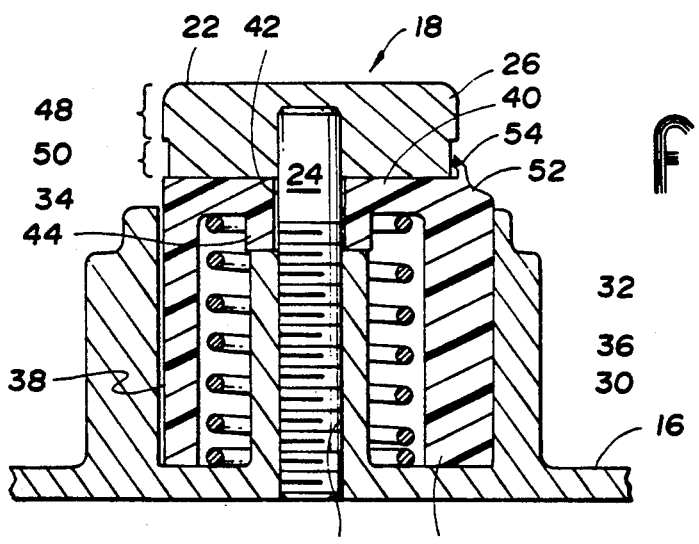
FIG. 2 is a cross-section of a first embodiment of the depth stop mechanism of the present invention, taken along line 2—2 in FIG. 1.
Figure 3:
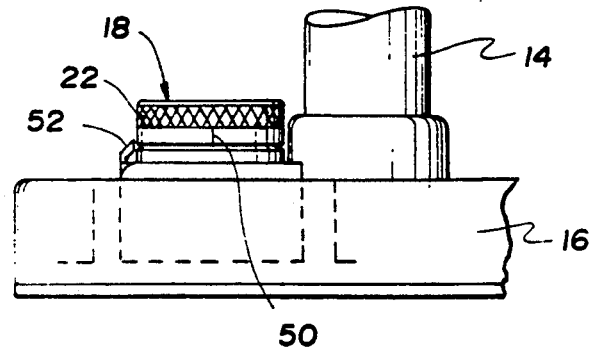
FIG. 3 is a cross-section of a portion of the plunge-type router of FIG. 1, taken along line 3—3.

With combined reference to FIGS. 1-3, there is shown a first embodiment of the depth stop assembly 18 of the present invention. In this embodiment, the stop assembly 18 includes a screw stud 24 pressed into a knob 26 to prevent relative rotation. Screw stud 24 is threaded to match the internal threads on an inner wall 28 of the boss 30 and is threadably mounted within it. The screw stud 24 thread pitch is 1/16 inch for this embodiment, although different thread pitches will also work. The boss 30 is molded or machined as part of the router base 16. In the preferred embodiment, a spring 32 is disposed around the inner wall 28 of the boss 30. As shown, a scale sleeve 34 surrounds the spring 32 and, when assembled, compresses the spring 32. An outer wall 36 of the boss 30 is generally concentric with the scale sleeve 34, and is sized to provide a small gap therebetween which allows the scale sleeve 34 to slide freely up and down (i.e. axially) within the outer wall 36.

As shown in FIG. 2, the scale sleeve 34 is preferably formed from a plastic material and has a cylindrical wall 38 molded to an annular top 40. The scale sleeve 34 includes a key 35 which protrudes from a portion of cylindrical wall 38 and extends into a complimentary notch in boss 30 in a known manner. This arrangement permits the scale sleeve 34 to slide axially within the bore 30, but prevents the scale sleeve from rotating with respect to the bore. Although the scale sleeve 34 is shown to be cylindrical, it could be of a different shape. Similarly, the scale sleeve 34 could be formed from a material other than plastic. As best shown in FIG. 2, the annular top 40 includes an aperture 42 having a diameter that is just large enough for the screw stud 24 to easily slide therethrough. Around the periphery on the underside of aperture 42 is a cylindrical lip 44 which helps to retain the spring 32 beneath the annular top 40.

Around the circumference, on the outside surface of the key 35 of the scale sleeve 34, is a printed scale 46 (FIG. 1) approximately one-half inch long, preferably having indicia identifying depth-of-cut increments of 1/16 inch. The height of the outer wall 36 of the boss 30 is sufficient to retain the scale sleeve 34 throughout its length of travel. As shown in FIG. 1, an opening 56 is cut into the outer wall 36 at a depth such that the depth-of-cut indication on the printed scale 46 will line up with the bottom of the opening 56 on the outer wall 36 for the corresponding depth-of-cut of the router 10. This arrangement allows for accurate visual adjustment down to increments of 1/16 inch.

Depth stop assembly 18 allows for further adjustments to be made that will increase the depth-of-cut accuracy to increments of 1/64 inch. Knob 26 of stop assembly 18 is of a generally cylindrical shape. The outer surface of the upper portion 48 of the knob 26 is preferably knurled to give the operator a better grip when turning the stop assembly 18 to adjust the depth-of-cut. The lower portion of the cylindrical side 48 of the knob 26 has four generally V-shaped notches 50 cut into it, spaced approximately 90° apart, with the notches being oriented in the vertical direction. As shown in FIG. 2, these notches 50 engage a tab 52 mounted to or molded as part of key 35 of the scale sleeve 34. The tab 52 is shaped to include a small flexible finger 54 which rests against the lower portion of the knob 26 and audibly snaps into engagement with a V-shaped notch when so aligned. Thus, since movement of the scale sleeve tracks that of the knob 26, the tab 52 will always be aligned with the lower portion of the knob and the V-shaped notches 50.

In operation, as the router operator rotates the stop assembly 18 clockwise, screw stud 24 is screwed into boss 30, lowering the stop assembly and, therefore, scale sleeve 34 into boss 30. As this clockwise rotation continues, a greater depth-of-cut is possible, as indicated by the printed scale 46. On the other hand, when the router operator rotates the stop assembly 18 counter-clockwise, screw stud 24 is unscrewed from boss 30. As counter-clockwise rotation continues, the knob 26 is raised and scale sleeve 34 is pushed up by coil spring 32. This results in a smaller depth-of-cut, as indicated by the printed scale 46. In the preferred embodiment, one full revolution of the knob 26 (i.e. 360°), raises/lowers the top surface 22 of the knob by 1/16 inch. This printed scale 46 can thus be used visually by the router operator to set the depth-of-cut to the nearest 1/16 inch increment. The router operator may then, if he requires more accuracy, continue rotating the stop assembly 18 and listen for a snapping sound made as the finger 54 engages one of the notches 50. Each snap, which occurs every quarter turn, will thus represent 1/64 inch difference in depth-of-cut, thereby giving the operator greater accuracy than with the visual scale alone.

Referring now to FIGS. 4-6, there is shown a second embodiment of the present invention. In this embodiment, a stop assembly 80 is comprised of a threaded screw member 82 pressed into or molded to a knob 84 to prevent relative rotation. The threaded screw member 82 is threaded to match internal threads on an inner wall 86 of a boss 88 and is threadably mounted therewithin. Threaded screw member 82 has a thread pitch of about 1/16 inch pitch for this particular embodiment, although other pitches could be used. The boss 88 is machined or molded into the router base 90. Positioned around the inner wall 86 of boss 88 and encircling the threaded screw member 82 is a scale sleeve 92. Outer wall 94 of boss 88 is generally concentric with scale sleeve 92, with a small gap therebetween them to allow scale sleeve 92 to freely slide up and down (i.e. axially) within outer wall 94.

Scale sleeve 92 is made of plastic and is generally cylindrical in shape. Molded into scale sleeve 92 are two retaining lips 96 which protrude radially inward from the inner cylindrical surface 98 near the top end 100 of the scale sleeve 92. As best shown in FIG. 6, retaining lips 96 are generally triangular shaped. Adjacent to either side of a retaining lip 96 are slots 102 cut through cylindrical side 104 of scale sleeve 92. Slots 102 begin at top end 100 and extend about half way down cylindrical side 104, thereby forming flexible sleeves around retaining lips 96. This arrangement allows for some flexing around lips 96 when the depth stop is being assembled.

In addition, a semi-spherical projection 106 is molded into the scale sleeve 92. Projection 106 is located on the inner cylindrical surface 98 half way between the pair of retaining lips 96, a small distance down from top end 100. This projection 106 is also located adjacent to and between two slots 108, similar to the slots around retaining lips 96, in order to allow projection 106 to flex during operation of the depth stop.

The height of outer wall 94 of boss 88 is sufficient to retain scale sleeve 92 throughout its length of travel. Scale sleeve 92 includes a key 111 which protrudes radially outward from the outer cylindrical surface 110. The key 111 is opposite the projection 106 and includes a printed scale 112 approximately one-half inch long, having increments down to 1/16 inch, imprinted thereon. An opening 114 is cut into outer wall 94 of boss 88 and is sized to receive key 111. The opening 114 has a depth such that the depth-of-cut indication on printed scale 112 will line up with the bottom of opening 114 on outer wall 94 for the proper depth-of-cut of the router. This scale, then, allows for visual adjustment down to increments of 1/16 inch in depth-of-cut. Also, a small projection 126 is molded into cylindrical side 104 of scale sleeve 92 near the bottom of scale sleeve 92. This projection 126 engages a small ledge (not shown) within boss 88 to insure that scale sleeve 92 does not become disengaged from boss 88 inadvertently.

This embodiment similarly allows for further adjustments to increase the accuracy to 1/64 inch increments. Knob 84 of stop assembly 80 is generally cylindrical in shape. Upper portion 118 of knob 84 has a larger diameter than the diameter of inner cylindrical surface 98 of scale sleeve 92 sufficient to cover top end 100 of scale sleeve 92. Lower portion 120 of the knob has a diameter that is slightly smaller than the inner cylindrical surface 98 of scale sleeve 92, yet large enough to hold retaining lips 96 when stop assembly 80 is assembled into scale sleeve 92. Slots 102, which allow for lips 96 to flex, allow for ease of assembly. Upper portion 118 and lower portion 120 of knob 84 are spaced apart a small distance to allow for neck 122 to be formed in between. Neck 122 is shaped in order to allow retaining lips 96 to nest therewithin when stop assembly 80 is assembled into scale sleeve 92. This configuration, then, will cause scale sleeve 92 to be retained by neck 122 of stop assembly 80, holding top end 100 of scale sleeve 92 against the upper portion 118 of knob 84, while still allowing knob 84 to rotate relative to scale sleeve 92.

Located about the circumference of lower portion 120 of knob 84 are four semi-spherical detents 124 spaced approximately 90° apart. When the depth stop is assembled, these detents 124 are axially aligned with semi-spherical projection 106 on scale sleeve 92 such that as knob 84 is rotated relative to scale sleeve 92, projection 106 will engage one of detents 124. This engagement between the two will create an audible snapping sound. Located about the circumference of the upper portion 118 of knob 84 are four indicia 128 spaced approximately 90° apart and aligned with the detents 124. When the projection 106 engages the detents 124, small tab 116, located on the top end 100 just above the printed scale 112, is aligned with the indicia 128, assisting the user to accurately adjust the depth-of-cut.

This second embodiment operates similar to the first embodiment. In operation, as the router operator rotates stop assembly 80 clockwise, threaded screw member 82 is screwed into boss 88, simultaneously lowering scale sleeve 92 into boss 88, due to the engagement between retaining lips 96 of scale sleeve 92 and neck 122 of the knob 84. More of the printed scale 112 is, therefore, covered by outer wall 94 of boss 88 indicating an increased depth-of-cut by the router. On the other hand, when the router operator rotates stop assembly 80 counter-clockwise, threaded screw member 82 is unscrewed from boss 88 and scale sleeve 92 is simultaneously pulled up with stop member 80, due to the engagement between retaining lips 96 and neck 122, so that more of printed scale 112 is exposed indicating less depth-of-cut.

Each full revolution of the knob (i.e. 360°) preferably represents a 1/16 inch change in the depth-of-cut. Printed scale 112 is thus used visually by the router operator to set the depth-of-cut to the nearest 1/16 inch. The router operator may then, if he requires more accuracy, continue rotating the stop assembly 80 and listen for the snapping sound made as the projection 106 engages one of the detents 124. Each snap, which occurs every quarter turn, represents 1/64 inch difference in depth-of-cut, thereby giving the operator greater accuracy than with the visual scale alone.

While the best modes for carrying out the invention have been described in detail, those familiar with the art to which this invention relates will recognize various alternative designs and embodiments for practicing the invention as defined by the following claims. For example, the thread pitch could be varied for a different depth-of-cut adjustment each rotation, or the number of notches usually positioned equiangularly, could be varied, further increasing or decreasing the precision with which changes in depth-of-cut are made.

What is claimed is:

1. An apparatus for controlling the depth-of-cut in a plunge type router having a motor housing which slides along support shafts mounted on a base to obtain a preset depth-of-cut, the apparatus comprising:
   a boss fixed to the base;
   a stop assembly including a rotating knob and a threaded screw member protruding therefrom for setting the desired depth-of-cut, the threaded screw member having threads spaced at a predetermined thread pitch threadably engaging the boss, the motor housing abutting the stop assembly upon reaching the desired depth-of-cut;
   a scale sleeve disposed within the boss, the scale sleeve being biased against the knob for axial movement therewith, the scale sleeve cooperating with the boss to prevent relative rotation; and
   a scale for identifying the depth-of-cut of the plunge router.

2. The apparatus of claim 1 wherein the scale comprises a plurality of notches spaced around the periphery of the knob at predetermined locations, the notches being engaged by a protruding member, fixedly attached to the scale sleeve, for engaging the notches as the knob is rotated, the engagement creating an audible sound at predetermined incremental changes to the depth-of-cut.

3. The apparatus of claim 2 wherein the scale further comprises indicia affixed to the scale sleeve to indicate the plunge router depth-of-cut.

4. The apparatus of claim 2 wherein the plurality of notches are V-shaped notches cut into the periphery of the knob, and wherein the protruding member is a flexible tab which audibly indicates engagement with one of the plurality of V-shaped notches.

5. The apparatus of claim 2 wherein the scale sleeve is comprised of a cylindrical side member molded to an annular shaped top member at one end of the cylindrical side member, the top member being biased against the knob by a spring disposed within the cylindrical side member.

6. The apparatus of claim 5 wherein the plurality of notches are V-shaped notches cut into the periphery of the knob, and wherein the protruding member is a flexible tab which audibly indicates engagement with one of the plurality of V-shaped notches.

7. The apparatus of claim 6 wherein the plurality of notches comprises of at least two notches spaced equiangularly apart and wherein the threaded screw member has 1/16 inch pitch threads.

8. The apparatus of claim 5 wherein the scale sleeve includes a semi-spherical projection protruding from the inside surface of the cylindrical side member, the knob including a plurality of semi-spherical detents, such that the semi-spherical projection will engage one of the detents semi-spherical detents as the knob is rotated relative to the scale sleeve, thereby creating a snapping sound during engagement.

9. The apparatus of claim 8 wherein the scale sleeve further includes at least one retaining lip protruding inward from the inside surface of the cylindrical side member, the knob including a circumferential neck in which the at least one retaining lip is received, thereby maintaining coincidental axial movement of the knob and the scale sleeve.

10. The apparatus of claim 9 wherein the cylindrical side member of the scale sleeve further includes a plurality of slots, extending from the end of the scale sleeve which abuts the knob to about mid-way down the cylindrical side, spaced such that the semi-spherical projection is enclosed by one pair of the slots adjacent to either side, thereby forming a flexible sleeve around the projection.

11. The apparatus of claim 10 wherein the cylindrical side member of the scale sleeve further includes a plurality of slots, extending from the end of the scale sleeve which abuts the knob to about mid-way down the cylindrical side, spaced such that the semi-spherical projection and each one of the plurality of retaining lips is enclosed by one pair of the slots adjacent to either side, thereby forming a flexible sleeve around the projection and each of the retaining lips.

12. The apparatus of claim 10 wherein the plurality of semi-spherical detents consists of four detents spaced 90° apart and the threaded screw portion has 1/16 inch pitch threads.

* * * * *